J. H. PETERS.

KITCHENOLA.

APPLICATION FILED SEPT. 29, 1920.

Reissued May 17, 1921.

15,106.

2 SHEETS—SHEET 1.

Inventor

Jacob H. Peters.

By Attorney J. O. Fowler.

J. H. PETERS.

KITCHENOLA.

APPLICATION FILED SEPT. 29, 1920.

Reissued May 17, 1921.

15,106.

2 SHEETS—SHEET 2.

Inventor

Jacob H. Peters.

By Attorney J. C. Fuller.

UNITED STATES PATENT OFFICE.

JACOB H. PETERS, OF EVANSVILLE, INDIANA.

KITCHENOLA.

15,106. Specification of Reissued Letters Patent. Reissued May 17, 1921.

Original No. 1,318,229, dated October 7, 1919, Serial No. 263,168, filed November 19, 1918. Application for reissue filed September 29, 1920. Serial No. 413,629.

*To all whom it may concern:*

Be it known that I, JACOB H. PETERS, a citizen of the United States, and resident of Evansville, in the county of Vanderburg and State of Indiana, have invented new and useful Kitchenolas, of which the following is a specification.

The object of the invention is to provide a simple, relatively inexpensive and efficient kitchen cabinet combining in its capabilities the features of a storage receptacle for the various provisions and utensils incident to cooking, a stove or heating apparatus, and a sink and related elements for facilitating the cleaning of the cooking utensils, dishes and the like, all of the several elements being arranged in compact form so as to occupy the minimum space so that the apparatus is particularly adapted for use in kitchenettes or small kitchens where the floor space is limited, as in apartment houses and the like.

Other objects comprise means to provide an exterior fuel supply, and interior stove and an intermediate connection; a stove and sink respectively contained in compartments and a sectional table covering therefor, one section serving as a stove shield and the other as a drain board; a vertical front closure for the stove adapted to serve as a shelf and the sink adapted to be drawn out like a drawer; a flour bin provided with a sifter and having a closure and brackets whereby it may be swung out when the door shield is in a closed position; a compartment beneath the stove, and a closure therefor adapted when open to support the stove which closure serves when lowered to act as a shelf.

Further objects and advantages will appear in the course of the following description it being understood that changes in form, proportion and details may be resorted to within the scope of the appended claims without departing from the spirit of the invention.

Figure 1:
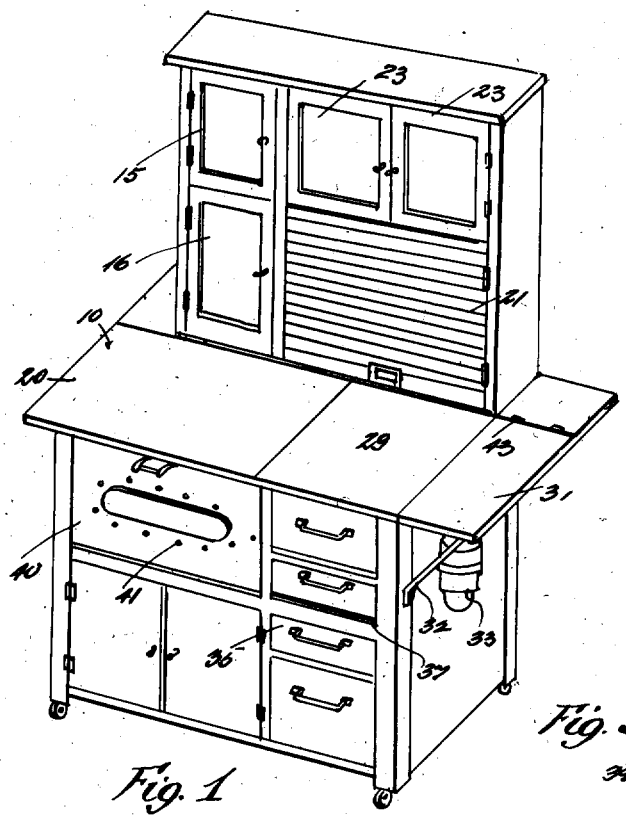
Figure 1 is a general outside view of a cabinet embodying the preferred form of the invention.
Figure 3:
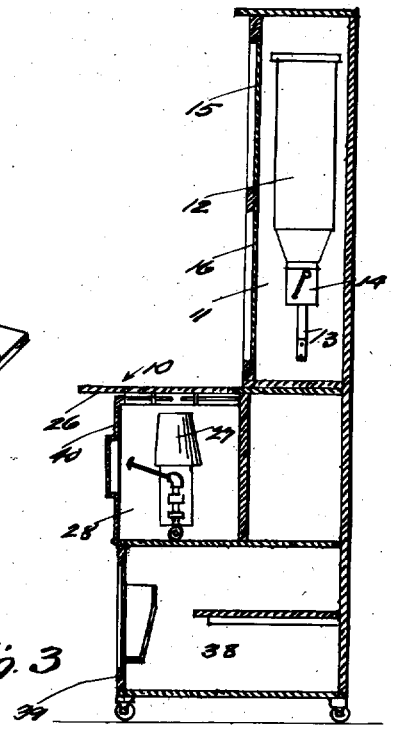
Fig. 3 is a vertical sectional view taken in the plane of the heating apparatus.

Essentially the apparatus is provided above the plane of the table portion 10 with a cabinet subdivided to form a plurality of compartments of which that to the left facing the same and represented as 11 is adapted for the reception of a flour bin 12 or the equivalent thereof mounted upon swinging brackets 13 to adapt it to be swung forward to an advanced position to give ready access thereto for filling, etc., said bin being equipped with a sifter attachment 14 and the compartment being fitted with upper and lower doors or closures 15 and 16, either or both of which may be provided on their inner surfaces with receptacles for smaller articles used in the kitchen in connection with culinary operations. At the right the cabinet constituting the superstructure of the apparatus is provided at the bottom, for example, with the compartment 17 in which may be arranged canisters or similar receptacles 18 for sugar, salt and the like and receptacles 19 for spices and condiments while supported within convenient reach at 20 may be a sugar dispensing apparatus, said compartment 17 being fitted as shown with a closure consisting of a flexible or roller curtain 21. Above said compartment and also to the right of the apparatus may be arranged a shelved compartment 22 having doors 23 and adapted for the reception of dishes or the like. The inner surfaces of these doors also may be fitted with receptacles 24 and 25 for small articles.

The table of the cabinet may consist of a hinged lid 26 for covering the top of a stove 27 or other heating apparatus arranged in the compartment 28 below the plane of the table, and a second hinged section 29 covering a sink 30 which may be in the form of a drawer or may be supported by a drawer structure, a leaf 31 being hinged to said section 29 and supported by a brace 32, said leaf projecting near the side wall of the lower portion of the cabinet to cover a tank or reservoir 33 for the fuel oil used in connection with the heating apparatus. The leaf obviously may be raised to facilitate filling the tank and when in its normal position constitutes an extension of the table of the cabinet. Beneath sink receptacles 30 there may be arranged a series of drawers or other receptacles 34, 35 and 36 and also a biscuit or kneading board 37 while under the compartment which contains the heating apparatus may be arranged a shelf compartment 38 having doors 39 and adapted for containing cooking utensils such as pots, kettles and the like, the inner-surface of the doors being equipped with brackets or rests for small articles such as graters, cooking forks or spoons and the like.

Figure 2:
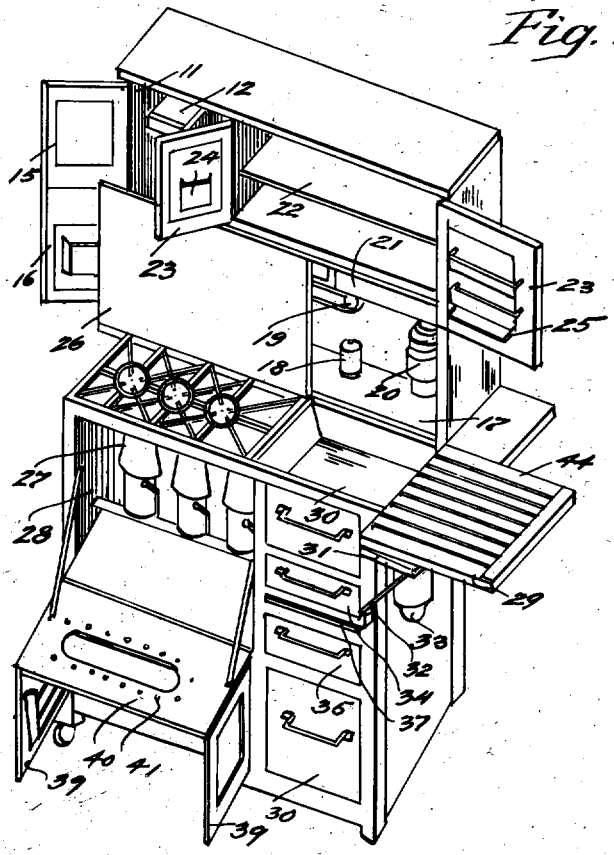
Fig. 2 is a similar view showing certain of the compartment closures open to illustrate the disposition of the contents.
Figure 4:
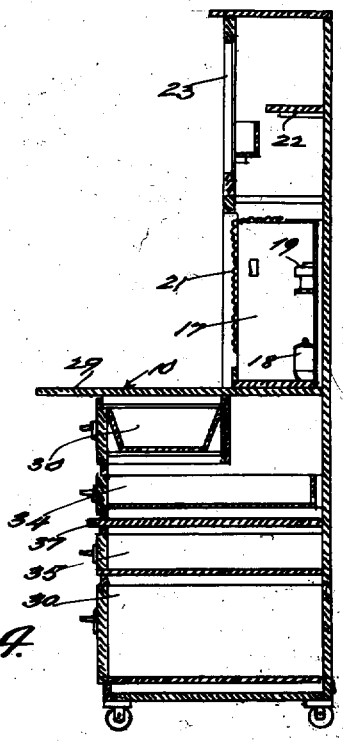
Fig. 4 is a similar view taken in the plane of the sink.

It will be understood that while an oil heating apparatus is shown a gas stove may be substituted therefor, proper and well known connections being formed therewith so as to supply the same from the house serving system and while when the heating or cooking apparatus is not in use the movable table top section 26 may be in a horizontal position to form a rest or support for various receptacles as in mixing or preparing foods, the raising thereof to the position indicated in Fig. 2 exposes the stove while the section of the table top thus displaced constitutes a shield or guard in rear of the burners for the protection of the upper portion of the cabinet and the contents thereof. The front of the heating compartment also is preferably provided with a shelf door 40 adapted to be let down to a horizontal position in front of the stove for supporting cooking utensils and is provided with vents 41 which give access to air required by the burners of the stove.

The table section 29 is hinged at its right edge to the leaf 31 which in turn is hinged at its rear extremity, as shown at 43, so that while the said section with the hingedly attached leaf or shelf 31 may be raised and swung rearwardly to an upright position to give access to the sink drawer and also to the fuel tank when the sink is adapted to be used for the ordinary purpose as in washing dishes, the said section 29 may be swung laterally upon its hinge connections with the leaf 31 to allow contact with the upper surface of the latter, in which position it constitutes a drain board, the exposed or normally lower surface thereof being grooved as at 44.

From the foregoing description it will be seen that practically all of the operations incident to cooking and serving means can be performed in connection with an apparatus such as described, the various provisions, utensils, condiments and the like being within easy reach of the operator and that after the preparation of the food the cooking thereof may be accomplished merely by exposing the heating apparatus by raising a section of the table top, and in the same way ready access may be had to the sink for the purpose of cleansing receptacles from time to time or after the completion of the meal, and the various articles may then be stored in their proper places and be covered or protected by the closing of the several compartment doors which presents a neat and attractive outside compartment.

What is claimed is:

1. A compartmental kitchen cabinet having a plurality of compartments, a stove carried in one of said compartments, a sink carried in another of said compartments, a table portion covering the stove and sink compartments, the latter consisting of independently movable sections, that covering the stove compartment being hingedly mounted for forward swinging movement to form a shield in rear of the stove, that covering the sink compartment being mounted for lateral movement for inversion to form a drain board when thus inverted.

2. A compartmental kitchen cabinet having a plurality of compartments, a stove carried in one of said compartments, a sink carried in another of said compartments, a table portion covering the stove and sink compartments, the latter consisting of independently movable sections, that covering the stove compartment being hingedly mounted for rearward swinging movement to form a shield in rear of the stove, that covering the sink compartment being mounted for lateral movement for inversion to form a drain board when thus inverted, said sink covering section being provided with a hinged terminal leaf projecting laterally beyond the sink compartment and mounted for swinging movement in a direction at right angles to the movement of the sink covering portion proper.

3. A kitchen cabinet having a pluraliity of compartments, a stove carried in one of said compartments, a sink carried in another of said compartments, a table portion covering the stove and sink compartments, the latter consisting of independently movable sections, that covering the above compartment being adapted to serve as a shield in the rear of the stove, and that covering the sink being adapted to serve as a drain board.

Signed at Evansville in the county of Vanderburg and State of Indiana this 30 day of August, 1920.

JACOB H. PETERS.